United States Patent Office 3,125,538
Patented Mar. 17, 1964

3,125,538
THALLIUM, ALKALI METAL AND SILVER ON SILICA CATALYST, AND ITS PREPARATION
Charles Arnold, Jr., Woodbury, and Jurgen M. Kruse, Pitman, N.J., assignors to E. I. du Pont de Nemours and Company, Wilmington, Del., a corporation of Delaware
No Drawing. Filed Dec. 29, 1958, Ser. No. 783,105
6 Claims. (Cl. 252—454)

The present invention relates to a novel supported silver catalyst and to a process for the preparation thereof. More particularly, the present invention relates to an improved silver catalyst particularly suited for catalyzing the reaction between nitric oxide and propylene to give acrylonitrile.

Silver catalysts are very well known, having been used for many years in the catalysis of various types of reactions including oxidation, reduction, and decomposition, among many others. As a catalyst silver has been used in many forms such as masses, i.e. plates or strips, of metallic silver, finely-divided silver, finely divided silver deposited on a support medium, and silver compounds, the exact form of silver used depending upon the nature of the system in which it serves as the catalyst. In addition, in certain instances, it has been found necessary to modify a given silver catalyst by the inclusion of various additives, in order to effect the desired results in the reaction.

Inasmuch as the performance of any potentially catalytic material, including the afore-discussed types of silver catalysts, is directly dependent upon the system in which it is used, that is, the catalytic activity of a given material is specific to the given system, various problems may arise in the selection or development of an optimum catalyst for a reaction system. Under certain reaction conditions, a catalyst may be completely ineffective in the reaction, whereas by proper modification of the reaction conditions the catalyst will function satisfactorily. In other cases, the modification of a catalyst with additives will change a previously unsatisfactory catalyst into the optimum catalyst for the reaction system. However, no general rules can be set up for the inclusion of such additives in a catalyst which rules will cover all types of reactions, because of the specificity of the relationship between the catalyst and the reaction system.

Further complications are introduced into the selection or development of the optimum catalyst for a given reaction by the fact that in a given reaction system a catalyst will function satisfactorily when one set of reactants are used but its performance may be wanting with another set of reactants. For example, in the process described in U.S. Patent 2,736,739 for the preparation of nitriles by the vapor-phase reaction of nitric oxide with certain types of unsaturated organic compounds, dehydrogenation catalysts in general are operative, a supported silver catalyst being preferred. In the reaction of propylene with nitric oxide in accordance with the patented procedure, the use of the preferred supported-silver catalyst gave conversions of only about 11% to acrylonitrile. Although the use of a recycle procedure overcomes the main drawbacks associated with conversions of such relatively low levels, the obtaining of higher conversions naturally is highly desirable.

Accordingly, an object of the present invention is the provision of an improved silver catalyst and a process for the preparation thereof. Another object of the present invention is the provision of such a catalyst which is especially suited for use in the reaction of nitric oxide with propylene to give acrylonitrile. A further object of the present invention is the provision of an improved catalytic process for the formation of acrylonitrile. Other objects will become apparent as the invention is further described.

It has been found that the foregoing objects may be achieved when a catalyst is provided comprising elemental silver deposited on a supporting medium which catalyst contains per gram-atom of silver from 0.03 to 1.3 gram-atoms of monovalent thallium ion and from 0.02 to 1 gram-atom of an ion of an alkali metal selected from the group consisting of potassium, cessium and rubidium. The catalyst preferably is formed by heating at a temperature of at least 320° C., preferably 475 to 525° C., a supporting medium containing adherent silver, thallous, and alkali metal compounds.

In accordance with the present invention, a mixture of a silver compound, the supporting medium, and water is agitated and heated to 80–100° C., ammonium hydroxide is added and heating is continued for a short period. Then a thallous compound and a potassium, cesium or rubidium compound are added, agitation being maintained throughout all additions. The mixture then preferably is cooled, and the solids removed therefrom are subjected to an activation process comprising heating them at a temperature of at least 320° C., preferably 475–525° C.

The following examples serve to illustrate specific embodiments of the catalyst and process of the present invention. However, they will be understood to be illustrative only and not as limiting the invention in any manner. Parts in the examples are parts by weight unless otherwise specified. The conversions to and yields of acrylonitrile reported are based upon nitric oxide, the limiting reactant, i.e. that present in the lesser amount. Conversions and yields were calculated in accordance with the following equation:

$$CH_3CH=CH_2 + 1.5NO \rightarrow CH_2=CHCN + 1\tfrac{1}{2}H_2O + \tfrac{1}{4}N_2$$

Thus,

Percent conversion $$= 100 \left( \frac{\text{moles of acrylonitrile produced}}{1.5 \text{ moles of nitric oxide charged}} \right)$$

Percent yield $$= 150 \left( \frac{\text{moles of acrylonitrile produced}}{\substack{\text{moles of nitric oxide charged} \\ \text{less moles of nitric oxide recovered}}} \right)$$

EXAMPLE 1

To a slurry of 1.8 parts of silver oxide in about 230 parts of distilled water was added about 100 parts of nitric acid-washed silica gel. This mixture was agitated and heated to about 80–100° C. Then, about 3 parts of 28% ammonium hydroxide was added, and agitation and heating were continued, the time of additional heating being about 15 minutes. After this interval, 1.25 parts of cesium hydroxide and 1.76 parts of thallous nitrate were added successively as aqueous solutions, agitation continuing throughout the additions. The mixture was cooled to room temperature and then filtered. The solids were dried at 110° C. to drive off a portion of the water to facilitate their handling, and, then, the solids were activated by heating in a stream of dry nitrogen at 475–525° C. for about 6 hours. The silver/cesium/thallium gram-atom ratio of the catalyst was calculated to be: 1/0.5/0.5, and the silver was present in the amount of 2.5% by weight of the catalyst. Analysis showed that the gram-atom ratio of silver/cesium/thallium in the catalyst was approximately 1/0.5/0.4.

Twenty-four parts by volume of the activated catalyst was packde into a 24-inch-long tube (O.D., ⅝ inch; I.D., ⅜ inch), one end of the tube being closed by a steel block to which a thermocouple extending into the midsection of the catalyst bed was attached. The catalyst bed rested on a plug of glass wool above the steel block. Glass helices ⅛ inch in diameter were packed into the reactor to fill it, a glass-wool plug retaining the helices within the tube. The tube was inserted vertically, catalyst-end down, into a furnace comprising a 2-inch-diameter glass tube wound with ribbon heaters, means for recording and controlling the furnace temperature being provided as were means for collecting the gaseous products issuing from the bottom of the reactor.

The reactor was purged with nitrogen and brought to operating temperature, 535–545° C., and a gaseous mixture (essentially free of nitrogen dioxide) of 55.81% of nitrogen, 8.59% of nitric oxide, and 35.60% of propylene (all by volume) was passed into the top of the reactor, the contact time of the mixture with the catalyst being of the order of 0.5–1 second. The conversion to acrylonitrile was 71% and the yield of acrylonitrile was 90%. The space-time yield was 7.8 pounds of acrylonitrile per cubic foot of catalyst volume per hour.

EXAMPLE 2

Another catalyst was prepared in accordance with the procedure of Example 1 with the exception that the thallous nitrate was omitted and 2.17 parts of cesium hydroxide was used. The gram-atom ratio of silver/cesium was 1/0.93. When this catalyst was used in the nitric oxide-propylene reaction according to the procedure of Example 1 (gas stream by vol.: 54.55% $N_2$, 8.05% NO, and 37.40% propylene), a conversion to and yield of acrylonitrile of 37% and 44%, respectively, resulted. The space-time yield was 3.9 pounds of acrylonitrile per cubic foot of catalyst per hour.

Two additional experiments were made in which a thallium-free catalyst was prepared and used in the specified reaction procedure. One catalyst prepared from 1.56% parts of cesium hydroxide (silver/cesium in gram-atoms: 1/0.7) gave acrylonitrile in 37% conversion and 42% yield. The other catalyst, prepared from 1.87 part of cesium hydroxide (1/0.8 gram-atom ratio of silver/cesium), gave acrylonitrile in 37% conversion and 44% yield. The other catalyst, prepared from 1.87 parts of equivalent to that of the first run in which the thallium-free catalyst was used.

EXAMPLE 3

Another catalyst was prepared in accordance with the procedure of Example 1, this catalyst, however, being prepared so as to contain thallium and no cesium. In the catalyst preparation, 1.76 parts of thallium nitrate was used. The gram-atom ratio of silver/thallium was 1/0.5. When the cesium-free catalyst was employed in the propylene-nitric oxide according to the procedure of Example 1, a 30% conversion to and 62% yield of acrylonitrile was obtained, the space-time yield being 3.7 pounds of acrylonitrile per cubic foot of catalyst volume per hour.

EXAMPLE 4

A series of catalyst were prepared in accordance with the procedures of Example 1 by using different weights of cesium hydroxide and thallous nitrate, and these catalysts were tested for their activity in the nitric oxide-propylene reaction. The compositions of the catalysts and the results of their use are summarized in the following table.

*Table I*

| Catalyst No. | Composition | | | Gas Mixt. Fed to Reactor | | | Acrylonitrile Produced | | |
|---|---|---|---|---|---|---|---|---|---|
| | Wt. TlNO₃ in prepn. (parts) | Wt. CsOH in prepn. (parts) | Ag/Cs/Tl, gram/atom ratio | $N_2$ | NO | $C_3H_6$ | Conv. Percent | Yield Percent | Space-Time Yield (lb./cu. ft. of catalyst/hr.) |
| A | 0.10 | 1.25 | 1/0.5/0.026 | 52.0–59.0 | 5.9–8.6 | 33.0–37.0 | 46 | 64 | 5.7 |
| B | 0.42 | 1.25 | 1/0.5/0.1 | 59.04 | 7.20 | 33.76 | 57 | 65 | 5.6 |
| C | 0.83 | 1.25 | 1/0.5/0.2 | 55.37 | 6.91 | 37.72 | 63 | 70 | 5.6 |
| D | 2.18 | 1.25 | 1/0.5/0.6 | 57.00 | 7.16 | 35.84 | 65 | 70 | 6.2 |
| E | 2.59 | 1.25 | 1/0.5/0.7 | 52.09 | 8.34 | 39.57 | 59 | 76 | 6.4 |
| F | 3.52 | 1.26 | 1/0.5/0.9 | 59.43 | 7.16 | 33.41 | 71 | 76 | 6.6 |
| G | 5.28 | 1.25 | 1/0.5/1.3 | 52.0–59.0 | 6.9–8.6 | 33.0–37.0 | 60 | 65 | 7.0 |
| H | 1.76 | 0.05 | 1/0.02/0.5 | 52.0–59.0 | 6.9–8.6 | 33.0–37.0 | 40 | 71 | 4.1 |
| J | 1.76 | 0.31 | 1/0.1/0.5 | 55.07 | 7.92 | 37.01 | 54 | 73 | 5.5 |
| K | 1.76 | 0.62 | 1/0.2/0.5 | 56.50 | 7.79 | 35.71 | 79 | 84 | 7.9 |
| L | 1.76 | 1.55 | 1/0.7/0.5 | 56.44 | 6.88 | 36.68 | 73 | 79 | 6.6 |
| M | 1.76 | 1.86 | 1/0.8/0.5 | 69.56 | 9.14 | 21.30 | 55 | 62 | 6.7 |
| N | 1.76 | 2.17 | 1/1/0.5 | 63.91 | 8.47 | 27.62 | 63 | 71 | 7.2 |

EXAMPLE 5

Another series of catalysts were prepared and tested in the specified reaction. The catalysts were prepared by following the Example 1 procedure, various amounts of various thallous compounds being used to give finished catalyst having a silver/cesium/thallium gram-atom ratio of 1/0.5/0.4, as summarized along with the test results in Table II.

*Table II*

| Catalyst No. | Tl Compound used in prepn. | Parts | Gas Mixt. Fed to Reactor (percent by vol.) | | | Acrylonitrile Produced | | |
|---|---|---|---|---|---|---|---|---|
| | | | $N_2$ | NO | $C_3H_6$ | Percent Conv. | Percent Yield | Space-Time yield (lb./cu. ft. of catalyst/hr.) |
| I | Tl₂SO₄ | 1.67 | 57.25 | 7.98 | 34.77 | 69 | 75 | 7.3 |
| II | Tl formate | 1.64 | 57.30 | 7.40 | 35.30 | 74 | 81 | 7.2 |
| III | TlOH | 1.46 | 56.53 | 7.56 | 35.91 | 62 | 80 | 6.2 |
| IV | Tl acetate | 1.71 | 60.05 | 7.53 | 32.42 | 70 | 78 | 6.9 |

EXAMPLE 6

To a slurry of 3.6 parts of silver oxide in 460 parts of water was added 140 parts of a dried, acid-washed silica gel. After agitating and heating this mixture to 80–100° C., 16 parts of 28% ammonium hydroxide was added, agitation and heating being continued an additional 15 minutes. Next, 1.10 parts of potassium hydroxide and 3.52 parts of thallous nitrate were added as aqueous solutions. The mixture was cooled and filtered, and the solids were dried at 110° C. and activated by heating in a stream of dry nitrogen at 475–525° C. for 6 hours. Analysis showed that the gram-atom ratio of silver/potassium/thallium was about 1/0.5/0.38 and the silver was present as approximately 2.5% by weight of the catalyst.

Using the reactor and following the procedure described in Example 1, except that the present catalyst was used, the volume percentage of the feed was 8% nitric oxide, 38% propylene, and 54% nitrogen, a conversion to acrylonitrile of 72% at a yield of acrylonitrile of 92% was obtained.

EXAMPLE 7

Following the procedure described in Example 6 for the preparation of the catalyst and for the nitrilation of acrylonitrile, except that 2.0 parts of rubidium hydroxide is substituted for the potassium hydroxide, equivalent conversions and yields of acrylonitrile are obtainable.

As shown by the foregoing examples, a very effective silver catalyst results when monovalent thallium ion and potassium, cesium, or rubidium ion are present therein. The effectiveness of this catalyst is reflected in the conversions and yields obtained when it was employed in the reaction of nitric oxide with propylene, i.e., conversions of 50–80% accompanied by very good yields, e.g. 62–90%. The conversions originally reported for this reaction were of about 11%.

As has also been shown, the presence on the silver catalyst of only the cesium ion or only the thallium ion, although improving to some degree the catalyst's effectiveness, does not give the high levels of yield, conversion, and space-time yield resulting from the presence of both cesium and thallium ions. The same results are obtained when only the potassium or rubidium ions are present; again the combination of one of these ions with the thallium ion is necessary for the high levels of yield, conversion and space-time yield. Furthermore, it has been found that the thallium ion must be present in the catalyst in lower-valence state, i.e. as the thallous compound. Thus, the exact thallium compound used in the catalyst preparation is not critical, so long as the thallium therein is present in monovalent state. Thus, in addition to the exemplified thallous nitrate, sulfate, acetate, formate, and hydroxide, such thallous compounds as thallous oxalate, oxide, phosphate and the like may be used. Nor is the exact potassium, cesium or rubidium compound used in the catalyst preparation critical, for example the sulfate, nitrate, acetate, and hydroxide, among many others, may be employed. The alkali metal and thallous compounds employed may be very water soluble or of limited water solubility. The specific thallous and alkali metal compounds used will be selected on the basis of many factors including economics and availability.

The alkali metal and thallous compounds are used in amounts such as to provide 0.02 to 1 gram-atom of alkali metal and 0.03 to 1.3 gram-atoms of thallium per gram-atom of silver in the catalyst. Preferably, the silver constitutes 2–5% by weight of the catalyst, the use of lesser amounts resulting in a wasteful excess of supporting medium whereas greater amounts are difficult to incorporate on the support. Although the use of silver oxide in the preparation of the catalyst was exemplified, the use of other silver compounds is equally feasible, due to the general reactivity of silver compounds with ammonium hydroxide. Therefore, the use of such silver compounds as the nitrate, oxide, acetate, carbonate, citrate, and the like is completely feasible. As is obvious, such explosive silver compounds as the acetylide and azide will not be employed.

Although the use of silica as the support medium was exemplified and is preferred, other conventional catalyst supports such as charcoal, pumice, and the like may be substituted for the silica. Preferably, the silica is washed with nitric acid prior to its incorporation into the catalyst.

The catalyst is prepared by adding ammonium hydroxide to a heated, i.e. at 80–100° C., and agitated mixture of the silver compound, water, and the support medium, heating and agitation being continued for a short period, for example of about 15 minutes. Upon the addition of the hydroxide to the mixture, the silverdiammino ion forms due to the reaction between the ammonium hydroxide and the silver compound, the hydroxide being added in at least stoichiometric amount with respect to the silver compound. The hydroxide is added to the mixture only when it is at elevated temperature to avoid all possibility of the formation of explosive compounds. Thereafter the alkali metal and thallous compounds are added with agitation, the order of addition being immaterial, following which additions the mixture preferably is cooled for ease of manipulation and then the solids removed therefrom, e.g. by filtration. The solids optionally are dried at elevated temperature, for example about 110° C., to drive off sufficient adherent water as to facilitate their handling. The solids are subjected to an activation procedure comprising heating at at least 320° C., preferably in an inert atmosphere such as one of nitrogen or argon. In this activation step, the silver is reduced to its elemental form. Although the use of temperatures of about 320° C. is quite suitable in the activation step, generally higher temperatures, i.e. of about 475–525° C., will be employed because at such temperatures the time required for activation is decreased. Thus, the use of temperatures within the range of 475–525° C. constitutes a preferred embodiment of the invention. Naturally, when the silver catalyst is used in the described process for acrylonitrile manufacture, the solids after drying at about 110° C. may be placed in the reactor where they will be activated during the operation of bringing the reactor to reaction temperature.

The afore-specified procedure constitutes the preferred method for preparing the catalyst. However, if elimination of the heat-activation treatment is desirable, the conventional chemical reduction technique used in the preparation of supported silver catalysts may be substituted for the heating step. That is, after the formation of the silverdiammino ion, a chemical reducing agent, such as a mixture of glucose and fructose formed by hydrolysis of sucrose or either one of these reducing sugars, is added to the mixture which thereafter is agitated. Following the addition of the thallous and alkali metal compounds, the catalyst is removed from the mixture and dried.

In the evaluation of the improved catalyst, it was employed under standard conditions in the nitric oxide-propylene reaction in accordance with the process of the afore-mentioned patent, the standard reaction conditions employed being those deemed optimum for a silver catalyst. However, the catalyst may also be used in accordance with any of the embodiments of the process recited in the patent, the use of different feed rates and compositions and different temperatures within the operable range of 400–700° C. being suitable.

Throughout this description, the term "alkali metal" has been used to refer specifically to potassium, cesium, and rubidium. The remaining members of the alkali metal family, sodium and lithium, while providing an operative catalyst, do not provide a catalyst of nearly the effectiveness of those illustrated in the examples. Accordingly, the catalyst of the present invention will contain an alkali metal selected from potassium, cesium or rubidium. The selection of the specific alkali metal is entirely a matter of choice based on availability, economics, and recovery problems.

This application is a continuation-in-part of our copending application Serial No. 770,573, filed October 30, 1958, now abandoned.

The invention has ben described in detail in the foregoing. However, it will be apparent to those skilled in the art that many variations are possible without departure from the scope of the invention. We intend, therefore, to be limited only by the following claims.

We claim:
1. An improved catalyst for catalyzing the reaction of propylene and nitric oxide to give acrylonitrile which consists essentially of elemental silver deposited on a silica support, said supported silver catalyst containing per gram-atom of silver 0.02 to 1 gram-atom of an ion of an alkali metal selected from the group consisting of potassium, cesium and rubidium and 0.3 to 1.3 gram-atoms of monovalent thallium ion, said silver being present in the amount of 2–5% by weight of the catalyst.
2. A catalyst according to claim 1, wherein the silver has been activated by heating at a temperature of at least 320° C.
3. A process for the preparation of the improved catalyst of claim 1 which comprises heating a mixture of a silver compound, water, and a silica support to 80–100° C., adding ammonium hydroxide and heating at said temperature, adding a compound of an alkali metal selected from the group consisting of potassium, cesium and rubidium and a thallous compound, removing the solids, and thereafter heating the solids at a temperature of at least 320° C. to obtain the catalyst.
4. A catalyst as claimed in claim 1 wherein the alkali metal is potassium.
5. A catalyst as claimed in claim 1 wherein the alkali metal is cesium.
6. A catalyst as claimed in claim 1 wherein the alkali metal is rubidium.

References Cited in the file of this patent

UNITED STATES PATENTS

| | | |
|---|---|---|
| 2,129,733 | Fulton et al. | Sept. 13, 1938 |
| 2,245,183 | Christ et al. | June 10, 1941 |
| 2,249,367 | Visser | July 15, 1941 |
| 2,337,421 | Spence et al. | Dec. 12, 1943 |
| 2,404,438 | Evans | July 23, 1946 |
| 2,424,083 | Finch et al. | July 15, 1947 |
| 2,523,686 | Engel | Sept. 26, 1950 |
| 2,535,082 | Mahan | Dec. 26, 1950 |